United States Patent [19]

Schneider

[11] 3,855,616

[45] Dec. 17, 1974

[54] PHASE SHIFT REDUCING DIGITAL SIGNAL RECORDING HAVING NO D.C. COMPONENT

[75] Inventor: Richard C. Schneider, Longmont, Colo.

[73] Assignee: International Business Machines Corporation, Armonk, N.Y.

[22] Filed: Oct. 1, 1973

[21] Appl. No.: 402,568

[52] U.S. Cl. .................................................. 360/40
[51] Int. Cl. .................................................. G11b 5/09
[58] Field of Search .................... 360/40, 41, 43, 45

[56] References Cited

UNITED STATES PATENTS

| | | | |
|---|---|---|---|
| 3,277,454 | 10/1966 | Chao | 360/45 |
| 3,356,934 | 12/1967 | Halfhill | 360/43 |

*Primary Examiner*—Vincent P. Canney
*Attorney, Agent, or Firm*—Herbert F. Somermeyer

[57] ABSTRACT

A digital signal recording system for recording on records having first and second signal-state levels for data values recorded within bit cells on the media. The duration of each of two discrete signal states in each bit cell are equal. In a first signal set, an odd number of transitions represent a first data value; while in a second signal set, an even number of transitions represents a second data value. One of the signal sets representing one of said data values has a higher frequency component for effectively tending to linearize the recording channel for minimizing peak shift while maintaining high data integrity and self-clocking characteristics. The transitions to be detected for recovering recorded data values are but a small number of the transitions actually recorded. The read-back signal has good resolution, less peak shift and dynamic range.

10 Claims, 8 Drawing Figures

PHASE SHIFT REDUCING DIGITAL SIGNAL RECORDING HAVING NO D.C. COMPONENT

BACKGROUND OF THE INVENTION

The present invention relates to digital signal recording systems and particularly to those recording systems and methods for high-density/high-frequency operation.

Since the advent of digital signal recording, various recording schemes have been employed for accomplishing diverse purposes. Not only is it desirable to have an efficient recording system, i.e., a number of bits represented per area of record media being high, but also the quality of the recording and read-back should be correspondingly high. Two serious problems occur in recording. One is peak shift; that is, the location of a transition from a first magnetic state to a second magnetic state shifts in space on the record and, when read back, appears as a time-perturbed signal which can yield errors thereby reducing data integrity. Accordingly, it has been an objective of many recording schemes to reduce such peak shift. Another problem is a D.C. component caused by the signal recorded on the media having durations at one signal state greater than another signal state. Such D.C. component prevents using an A.C. coupling in the recording process. The presence of a D.C. component in the data recording may also result in unwanted low frequencies in the readback signal. Such unwanted low frequencies may disturb the read signal baseline to make reliable data recovery more difficult.

Examples of prior art recording systems include the NRZI system which records a signal transition in a bit cell for representing binary 1 data value and no transition for representing a binary 0 data value. While the efficiency of this recording scheme is very high, i.e., the number of transitions required to record data appears to be minimal, many data sets employ strings of 0's. Remember, for high-density recording, it is extremely important to employ self clocking techniques; that is, the readback circuits are frequency and phase synchronized to the readback signal. If there are no transitions being read back, then such clocking systems tend to drift yielding possible timing errors and, thence, data errors. For low-density recording, NRZI is efficient.

Improved forms of NRZI have been proposed; for example, the run-length of 0's has been limited to two (run-length limited NRZI). This arrangement guarantees a certain number of transitions between magnetic signal states per unit record track length thereby yielding a self-clocking system. Even when such self-clocking systems are employed at higher and higher data frequencies and densities on the record media, there are still severe peak-shift problems which can yield data errors. Also, because the frequencies employed are always the lowest possible frequencies, there is little, if any, biasing or linearizing effect on the recording channel.

Another system employed in the prior art for obviating some of the problems associated with NRZI recording is the so-called phase-encoded (PE) recording system. While this system has good D.C. balance, it requires a flux change density (fci) that is twice the data bit density. Thus, to record at a data density of 1,600 bits per inch, 3,200 flux changes per inch (fci) are recorded on the media. Moreover, all these high-density flux changes must be properly detected for reliable readback. Accordingly, while PE recording is highly desirable for intermediate densities, it has certain deficiencies that prevent its successful usages at higher densities. In fact, a run-length limited NRZI (mentioned above) appears to be superior to PE at somewhat higher densities than has been employed for PE recording (1,600 bits per inch along a track) in the past.

Another system that relates very closely to PE recording is frequency modulation (FM), sometimes referred to as DFE, double-frequency encoding. The problems associated with PE recording also appear in DFE.

The MFM (modified frequency modulation) system reduces the number of transitions required to represent a given number of data bits over DFE, but is still subject to undesirable phase-shift and baseline problems.

Yet another system, herein termed QFE for quad-frequency encoding, employs a low-frequency for binary 1's and four times that frequency for binary 0's. In this case, a binary 1 representing transition is always at an edge of a bit cell; while four binary 0 representing transitions begin at the edge of a bit cell and extend throughout the bit cell. This system yields an even number of transitions in a row for a string of 0's and requires a 4:1 wavelength relationship still yielding phase shift and, hence, a probability of error. It does provide some linearizing of the channel because of the quad-frequency component, particularly at higher bit or data frequencies.

Linearizing of recording channels has been done for years using so-called A.C. bias at seven to eight times the frequency being recorded. In many systems, there is an apparent erasure by the A.C. bias; i.e., during readback, one cannot detect the presence of A.C. bias. This can be caused by several factors. A significant factor is that the reading and recording transducers act as low-pass filters, hence, tend to minimize the effect of the bias amplitude in the recording channel, i.e., tends to obliterate the A.C. bias. Some have reported that the A.C. bias effectively A.C. erases the record medium. Even at recording densities exceeding 100,000 flux changes per inch, there appears to be a minimum of erasure provided the appropriate transducers and circuits are utilized with such media. There does appear to be a linearizing effect on the recording channel, particularly the media, through the use of high-frequency signals. This linearizing effect in the recording reduces undesirable phase shift.

SUMMARY OF THE INVENTION

It is an object of this invention to provide digital signal recording having balanced D.C. components in each bit cell and reduced phase shift.

The method of recording two data values in a two-level record member preferably consists of a magnetic record member having successive bit cells with one cell for recording one data bit of either data value. The method comprises representing a first data value in a given bit cell as an odd number of transitions, preferably one, between the two levels of the record signal states such that the magnetic level following two successive bit cell boundaries differs and representing a second data value in another bit cell as an even number of transitions between the record state levels such that the magnetic levels following the two successive bit cell boundaries are the same. The method times the transitions such that the time durations and/or the extent of each level in each and every bit cell are substantially equal. It is preferred that the number of transitions representing the second data value be greater than the number of odd transitions such that a linearizing effect is had on the recording channel. This is particularly useful in magnetic recording systems.

It is preferred that at least one of the first data value (odd number) transitions be centered in a bit cell. As to the even number of transitions representing a second data value, it is preferred that they also be centered. For example, when the number of second data value transitions is equal to four, the first or leading transition would be one-eighth of a bit cell from the leading bit cell boundary, the second transition one-fourth of a bit cell from the leading transition, the third transition one-fourth of a bit cell from the second transition, and the lagging transition one-fourth of a bit cell from the third transition and one-eighth of a bit cell from the lagging bit cell boundary.

A second form of recording in accordance with the invention is to have all the zero-representing transitions displaced from the leading transition or from the leading bit cell boundary and the immediately preceding transition by one-fourth of a bit cell. The most lagging transition is then coincident with the lagging bit cell boundary. This arrangement appears to exhibit less phase shift than where the first or leading transition for representing a second data value is coincident with the leading bit cell boundary, and each of the successive transitions are displaced from the immediately preceding transition by one-fourth of a bit cell. The most-lagging or last transition in a bit cell is displaced from the lagging bit cell boundary by one-fourth of a bit cell distance.

The above method and invention can be applied to prior art type recording schemes such as PE, NRZI, MFM, etc. Additionally, the high-frequency components can assist in clocking the readback circuits. A center one of such high-frequency component transitions not subject to phase shift is a suitable clocking assist to primary clocking obtained from the odd or low-frequency components.

The foregoing and other objects, features, and advantages of the invention will become apparent from the following more particular description of a preferred embodiment of the invention, as illustrated in the accompanying drawing.

THE DRAWING

INTRODUCTION TO THE DETAILED DESCRIPTION

Recording waveforms and their subtle effects on data detection from the readback waveform are best understood by a detailed comparison of various waveforms in order to illustrate the interactions of the signals with the recorder apparatus, as well as the effect during recording and readback. One of the main problems in digital recording systems is to establish high density while maintaining high data integrity and reliable readback. To this end, it is highly desirable that the data recording and readback channels be linearized by some means within the recording and waveforms. Also, it should minimize peak shift, that is, the shifting in time or the shifting in place of transitions representing data from the desired position. Such peak shift will be fully explained with respect to the FIG. 1 illustrations.

Another aspect is D.C. balance in the signal recording waveform. At high densities, it is desirable that the effective D.C. component be zero in each bit period or in a small number of bit periods. This is required because most readback transducers are effectivley an A.C.-coupled device such that any D.C. component may cause signal perturbations yielding a probability of error higher than if no such D.C. component resides in the digital waveform. Another factor is the relationship of wavelengths, i.e., the ratio of maximum-to-minimum wavelength should be held to a small number. Many of these requirements appear to be contradictory, yielding a compromise design in many instances.

Waveforms of the Inventive Recording Techniques

Figure 1:
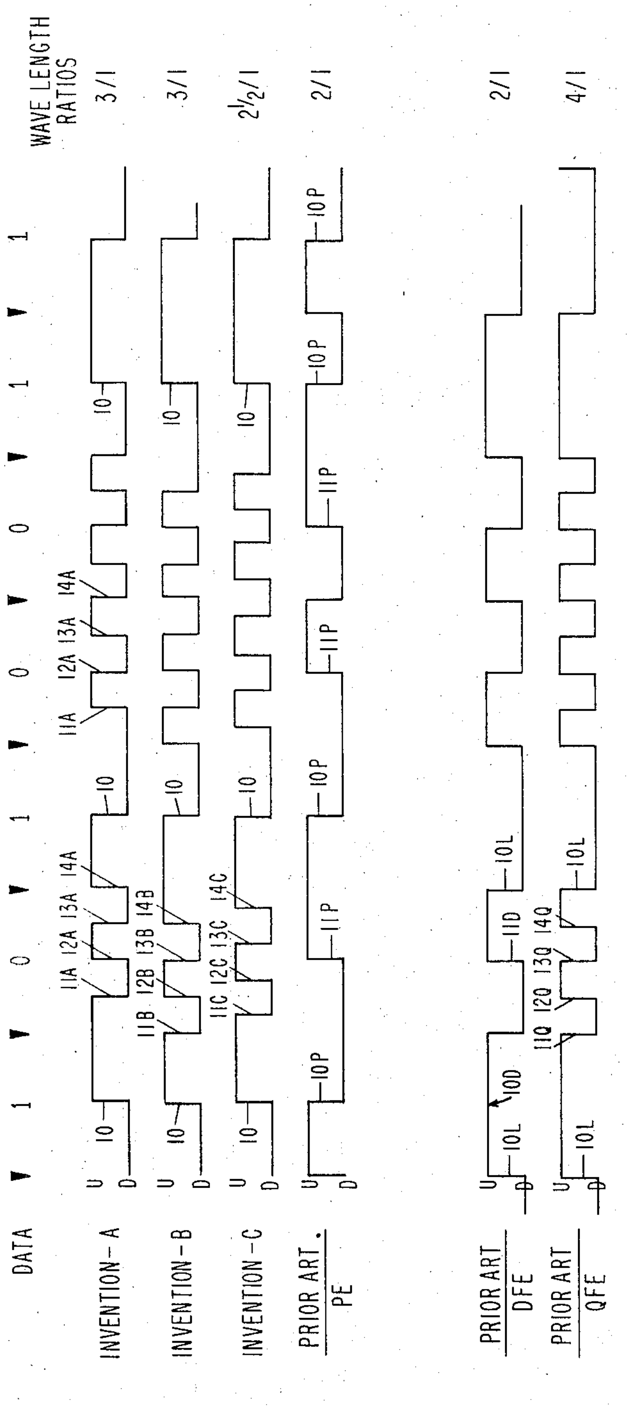
FIG. 1 is a set of idealized signal waveforms illustrating the invention in three of its preferred forms, along with three waveforms illustrating prior art waveforms for enabling a detailed comparison between the inventive waveforms and the prior art waveforms.

Referring now to FIG. 1, the three waveforms used to illustrate the operation of the invention are labeled as "Invention A, B, and C," with a first preferred form being "A" and another and more preferred form being "C." Signals A and B have a wavelength range of 3:1; while wavelength C, the best form, has a wavelength ratio of 2.5:1. All of the three signals have zero D.C. average components in each bit cell.

In all three signals, a binary 1 is represented as a single transition 10, preferably located in the exact cell center of a bit cell in the recording medium and in the center of the bit period of the readback and recording signals. Cell boundaries are represented at the top of the figure by the caret marks. Examination of the binary 1 representing signals for all waveforms A, B, and C shows there is an equal duration for the up signal as there is for the down signal, represented respectively by U and D. Accordingly, each binary 1 within the bit cell has D.C. balance; i.e., there is no net D.C. component. Also, the signal level entering all binary 1 containing bit cells is at a first level and exits at a second level; i.e., there is a net switching between levels for representing the binary 1, i.e., an odd number of transitions.

The invention is best understood by analyzing the binary 0 portions of the waveforms. In waveform A, four transitions within each binary 0 containing bit cell represent the binary 0. The first transition 11A is displaced from the leading bit cell boundary represented by the caret on the left-land portion thereof by one-fourth of a bit cell. Each succeeding transition between record states 12A, 13A, and 14A is displaced immediately preceding transition 11A, 12A, or 13A, respectively, by one-fourth of a bit cell. The most-lagging tranasition 14A is coincident with the lagging bit cell. From inspection of waveform A, it is seen that there is no net D.C. component in any of the 0-containing bit cells. Also, the signal level entering the 0-containing bit cell is the same level as that exiting the binary 0-containing bit cell. Transition 14A occurs at the boundary causing the level to exit at the same level as the cell was entered.

Waveform B represents binary 1's in the same manner as waveform A. The binary 0 representation has the four transitions 11B-14B at the leading portion of the bit cell/period. Transition 11B is always at the leading edge boundary of the bit cell, transition 12B being time displaced one-fourth of a bit period/cell, with 14B similarly displaced. The most-lagging transition 14B leads the lagging edge boundary by one-fourth of a bit cell.

Waveform C is different from both waveforms A and B in that the leading transition 11C, while representing a 0, is displaced from the leading boundary of the bit cell by one-eighth of the bit cell. The succeeding transitions 12C, 13C, and 14C are respectively displaced by one-fourth of the bit cell. The most-lagging transition 14C is one-eighth of a bit cell upstream from the lagging bit cell boundary. For purposes of illustrating the implementation of the present invention, waveform C has been selected as showing a best mode of practicing the invention with respect to FIGS. 4, 5, 6, and 7. The effect of peak shift on creating errors appears to be the least in waveform C. However, depending on the type of equalization techniques used in recording and readback, any one of the three waveforms may be the more acceptable for a given recording application.

Comparisons With Prior Art Waveforms

Continuing on with FIG. 1, the PE waveform as mentioned before has no net D.C. value in any given bit cell. Whenever a plurality or odd number of data value changes occurs, an odd number of long wavelengths similarly occurs. This string of long wavelengths is believed to be one factor in causing phase-shift problems of PE recording, even though the wavelength ratio is only 2:1. In fact, particular compensation techniques have been required to accommodate such phase shifts in PE recording. Such compensation techniques are not necessary with the present invention to avoid or accommodate such phase shift. Hence, even though each bit cell in PE recording has no net D.C. component, there can be an effective net D.C. component over a plurality of bit cells. Such plural bit cell D.C. component is not found in any of the inventive waveforms A-C.

Another prior art waveform is the double-frequency encoding or FM encoding scheme. This scheme produces a waveform very similar to the PE waveform; however, for binary 1 wherein there is no transition in the center cell such as at 10D, each such bit cell having an effective D.C. component, the problem is avoided by the present invention. Because of the similarities between DFE and PE, the same phase-shift problems occur.

Another prior art system, herein termed "QFE," is quad-frequency encoding. The QFE signals are similar to DFE in that a 1 signal is represented by no transition within a bit cell, or it can be argued that a 1 is represented by a transition at the leading bit cell, such as 10L. The binary 0 is represented in QFE by a series of transitions 11Q, 12Q, 13Q, and 14Q, the lagging transition being 10L representing a binary 1 in the next succeeding bit cell. While the high-frequency components represented by the transitions 11Q-14Q may linearize a channel for enchancing phase shift, there is a D.C. component in the signal by a series of odd numbers of 1's. Hence, for A.C. coupling, such as through a magnetic transducer, the QFE signal still retains difficulty with peak shift, such as that found in PE and DFE recording. It also has a wavelength ratio of 4:1, the greatest ratio of any of the discussed waveforms. This requires a greater pass band in a recorder channel than that required for any of the other discussed waveforms.

In initial appearance, QFE appears to look somewhat similar to the inventive waveforms. However, because of its longer wavelength, there can be intertrack interference in closely packed tracks, such as found in disk files and the like. Also, because of the long wavelength (4:1 ratio), there may be overwrite problems; i.e., it may be required that the previous recording be erased prior to recording the new signal. Such a requirement is avoided by the inventive waveforms.

In testing waveforms in accordance with the present invention, there was no measurable peak shift at a recording density of 40,000 bits per inch. This corresponds to a flux change per inch in the zero area of 160,000 fci. The record media was not A.C. erased. Also, it was found there was no D.C. restoration required in the readback circuits even when the inventive waveforms are supplied through a transformer. D.C. restoration may be required in PE, DFE, and QFE. Because of the known net D.C. components and the relationship of the close-together transitions to the 1-representing transition, there are some phase-shift and AC-balance benefits. Also, in certain tests conducted on disk files, it was found that when the transducer was off the track, reliable readback over and above that used with DFE and MFM was achieved.

NRZI Data Recorded Using the Inventive Recording

Figure 2:
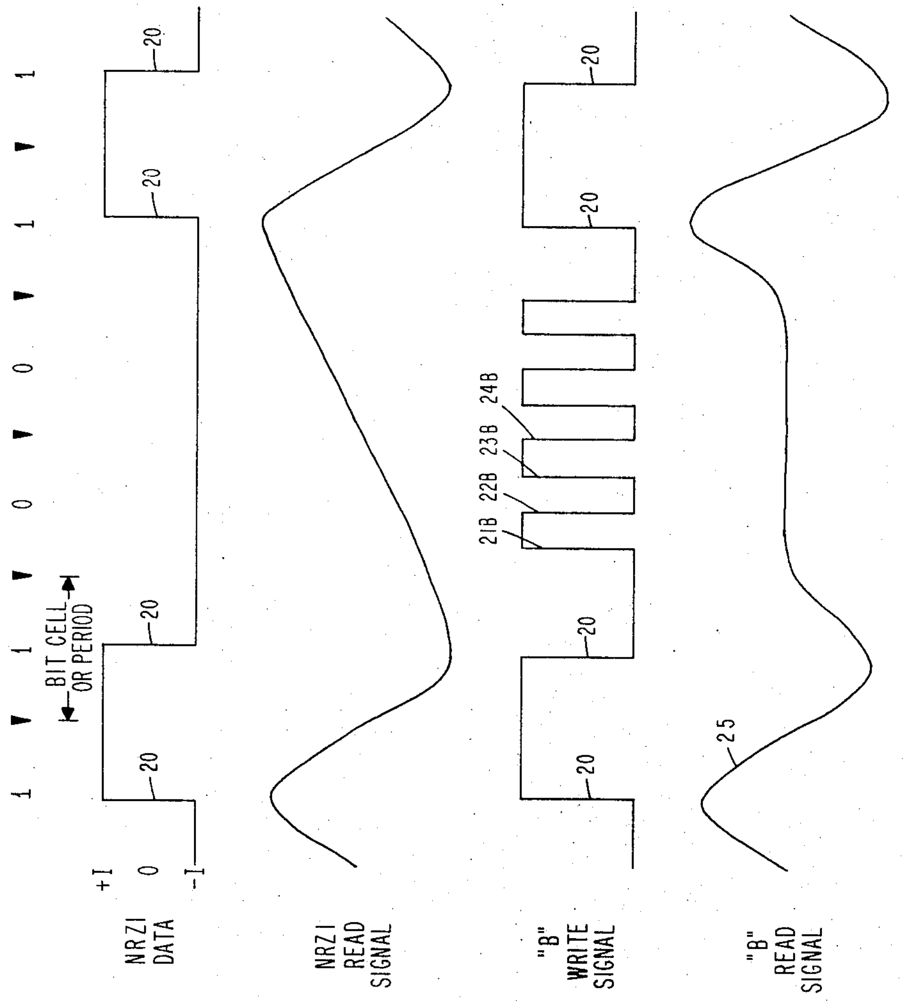
FIG. 2 is a set of idealized waveforms illustrating an application of the present invention to NRZI data representation together with a comparison of the readback signal between readback from the inventive recording system and an NRZI recording system.

Referring next to FIG. 2, the NRZI data waveform represents binary 1's as transitions 20 and binary 0's as no transitions in the bit cells. The readback signal is shown directly below the write signal. Depending on the spacing of the transitions, the readback signal waveforms become substantially different. Note that the peaks of the inner 1's of the NRZI read signal are quite broad with zero crossing of the readback waveforms being at the bit cell boundary between the two adjacent 1's. Such a widened or shifted waveform can cause errors in readback circuits.

The corresponding write waveform, using the "B"-type of inventive signal, is shown with the 1 transitions represented by numeral 20 and the 0 transitions, respectively, by 21B, 22B, 23B, and 24B. The readback waveform, as observed on an oscilloscope, is shown at 25 wherein there is a peak for each 1 transition and the readback signal being substantially at baseline for the 0 signals. It is believed that because of the low-pass characteristic of the readback transducer, it effectively filters out all signals in the 0 bit cells which were recorded on the record medium. Examiniation of the NRZI read signal and the read signal 25 shows there is a pulse-slimming effect on the transitions representing the inner 1's. It is this pulse-slimming effect of recording in accordance with the invention that reduces peak shift and facilitates readback at high densities.

When comparing the inventive readback signals with QFE readback, it was noted that from the "0" containing bit cells a slight shift in baseline occurs. This shift is believed to be caused by D.C. component in the QFE signal. Such component is avoided by the present invention as above stated.

MFM Data Recorded Using the Inventive Techniques

Figure 3:
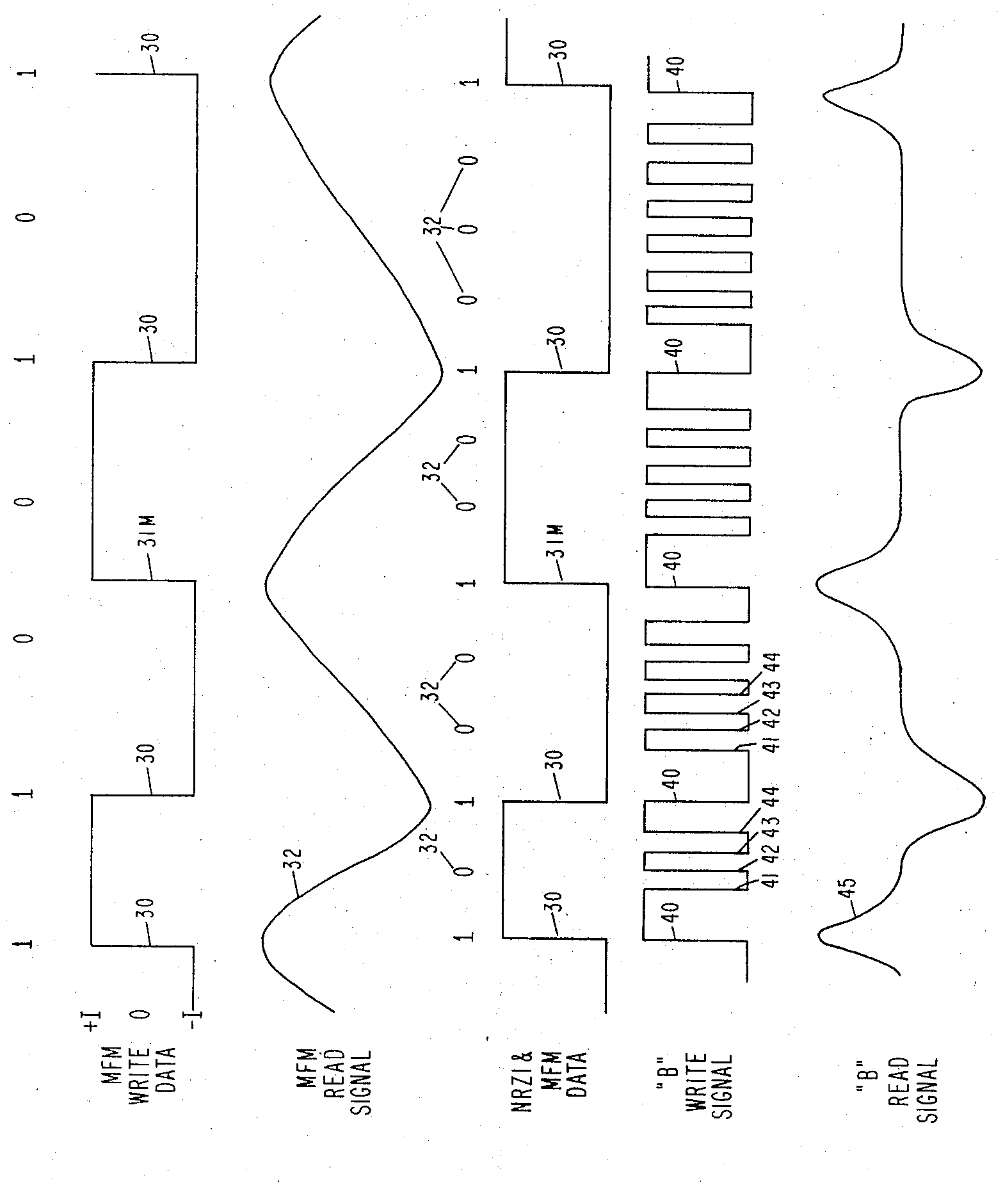
FIG. 3 is a drawing similar to that of FIG. 2 but comparing MFM (modified frequency modulation) with the inventive system.

Referring to FIG. 3, a typical MFM signal is represented at the top of the drawing wherein the 1 transitions are enumerated by 30, and a clock transition between two successive 0-containing bit cells by numeral 31M. Readback signal 32 can be compared favorably with the NRZI read signal of FIG. 2. Note that this signal is subject to peak shift. Not only that, but the allowable or tolerable peak shift in readback is 25 percent, much less than that of NRZI which is 50 percent. MFM does facilitate self-clocking operations.

The MFM signal can be considered as a high-density NRZI signal as shown in the waveform labeled "NRZI and MFM Data." The signal waveforms of the MFM write data and of the comparison waveform are identical. The "NRZI" data for the MFM write signal is represented at the top of the latter waveform, with the transitions being enumerated the same as in the MFM waveform. Numerals 32 denote the added 0's to represent 0's in smaller "NRZI" bit cells indicated by the small carets as opposed to the larger bit cells in the MFM representation scheme. By treating the MFM signal or any other encoded signal as an NRZI signal, the invention can be applied with advantageous results; that is, MFM can be recorded using the techniques of the present invention to yield readback signal 45 which provides an effective pulse-slimming of the readback signal, reduces phase shift, and gives more reliable detection than if the invention were not employed.

The "B" technique is illustrated with MFM data. In the "B" write signal, numeral 40 denotes the 1's change, which corresponds to the transitions 30 and 31M of the MFM signal. The numerals 41, 42, 43, and 44 represent the 0-representing transitions as aforedescribed when the MFM is interpreted as an NRZI signal having greater bit cell density. The readback signal 45 can be favorably compared with that of 32 in that the peaks are theoretically coincident. However, in practice, the peaks of signals 32 are shifted in time and flattened out making detection more difficult, i.e., may require a slope detector. On the other hand, readback signal 45 from using the invention has slim readback pulses precisely corresponding to the 1-representing transitions. Since these are not phase shifted, detection and self-clocked timing is facilitated.

Reinterpreting an NRZ-type encoded signal, such as MFM, to an NRZI representation by multiplying the number of bit periods by some integer, then treating all transitions as NRZI 1's and all intervening spaces as NRZI 0's is termed "NRZI coded interpretation." Using such interpretation, the invention is applied to such waveforms with attendant improvements.

Hardware Implementation of the Type "C" Recording Technique

Figure 5:
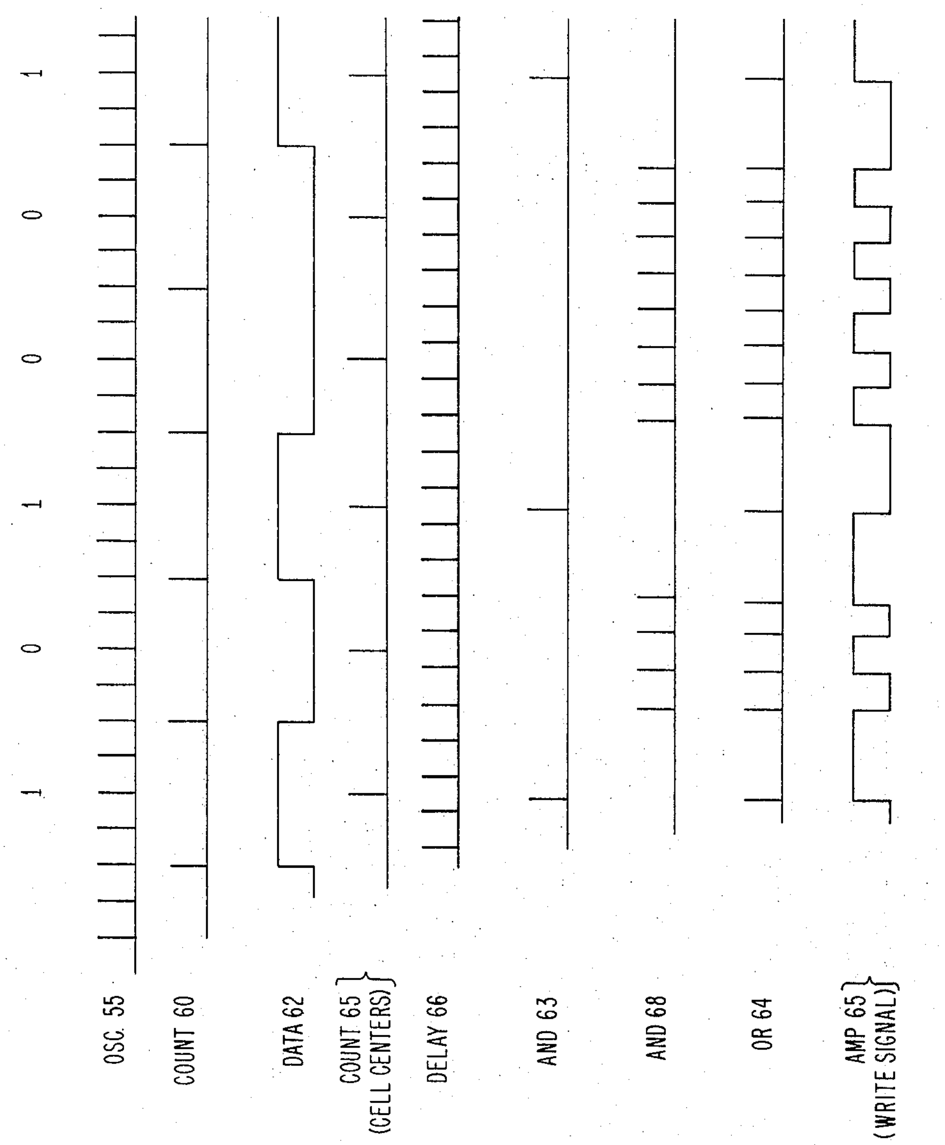
FIG. 5 is an idealized timing diagram used to explain the operation of the FIG. 4 illustrated apparatus.
Figures 4, 6:
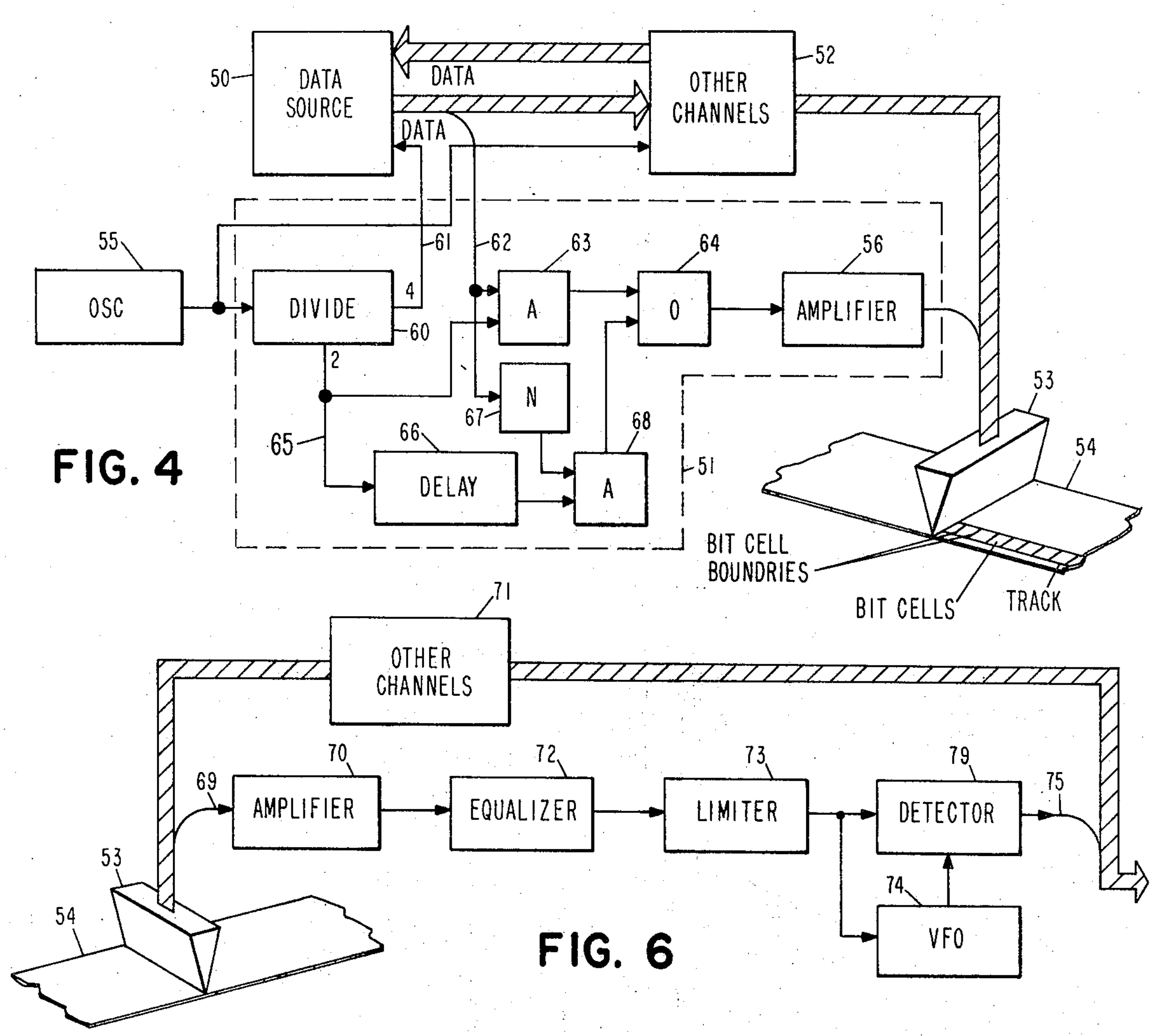
FIG. 4 is a diagrammatic showing of a write circuit for use with the inventive "C"-type recording.
FIG. 6 is a diagrammatic showing of a readback circuit employable with the "C"-type waveform of the present invention.

Referring next to FIGS. 4 and 5, a recording circuit for recording waveform C of FIG. 1 is shown in diagrammatic form. The waveforms in FIG. 5 illustrate the timing and operation of the FIG. 4 illustrated operation. A data source 50 supplies data in byte form, i.e., 8 bits in parallel, through channel 51 and other channels 52, thence, multitrack head 53 to be recorded on magnetic tape 54. In practice, one or more channels may be used, it being understood all channels are constructed identically. A common write oscillator 55 supplies its pulses to all channels at four times the frequency the data is to be recorded. This corresponds to generating the four transitions in a 0-containing bit cell. In channel 51, the four times data frequency pulses from oscillator 55 are divided by four with divide circuit 60. Divide-by-four circuit may be a counter having two flip-flops interconnected to count down by four in a repetitive manner. Each time divide circuit 60 supplies a pulse over line 61, another bit of data has to be supplied to the recording channel. Data source 50 responds by changing the data pattern at this time, i.e., at the edge of each bit cell. Data is supplied to channel 51 via line 62. AND 63 responds to the data value (up or down for binary 1 or 0) on line 62 and the center-of-cell pulse on line 65 which is termed the "count 65" pulses to gate a transition through OR 64 to bistable recording amplifier or trigger 56. Whenever a pulse on line 65 is gated through AND 63 by the data 62 signal, amplifier 56 changes state as indicated by the signals labeled AND 63 and AMP 65 write signals.

Additionally, the 0 recording transitions have to be generated. To this end, the center-of-cell and edge-of-cell pulses on line 65 are supplied to ⅛ bit period delay circuit 66 for supplying its delayed pulses for selectively generating the 0-indicating pulses via AND 68. The data on line 62 is inverted by inverter 67 to enable AND 68 to pass the delayed 66 pulses whenever binary 0 appears on line 62. The output of AND 68 is also supplied through OR 64 which combines the binary 1 and binary 0 representing signals into one train of pulses to OR 64. Bistable amplifier 56 responds to OR 64 pulses to generate the write signal illustrated in FIG. 5, which is the same as that illustrated in FIG. 1 for the "C" waveform.

Figure 6A:
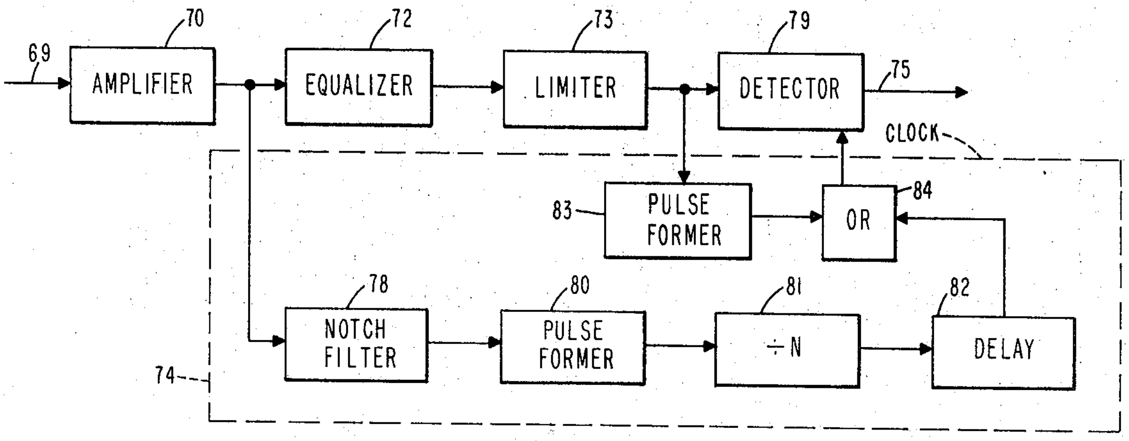
FIG. 6A is a diagrammatic showing of an alternate clock scheme for the FIG. 6 illustrated readback system.
Figure 7:
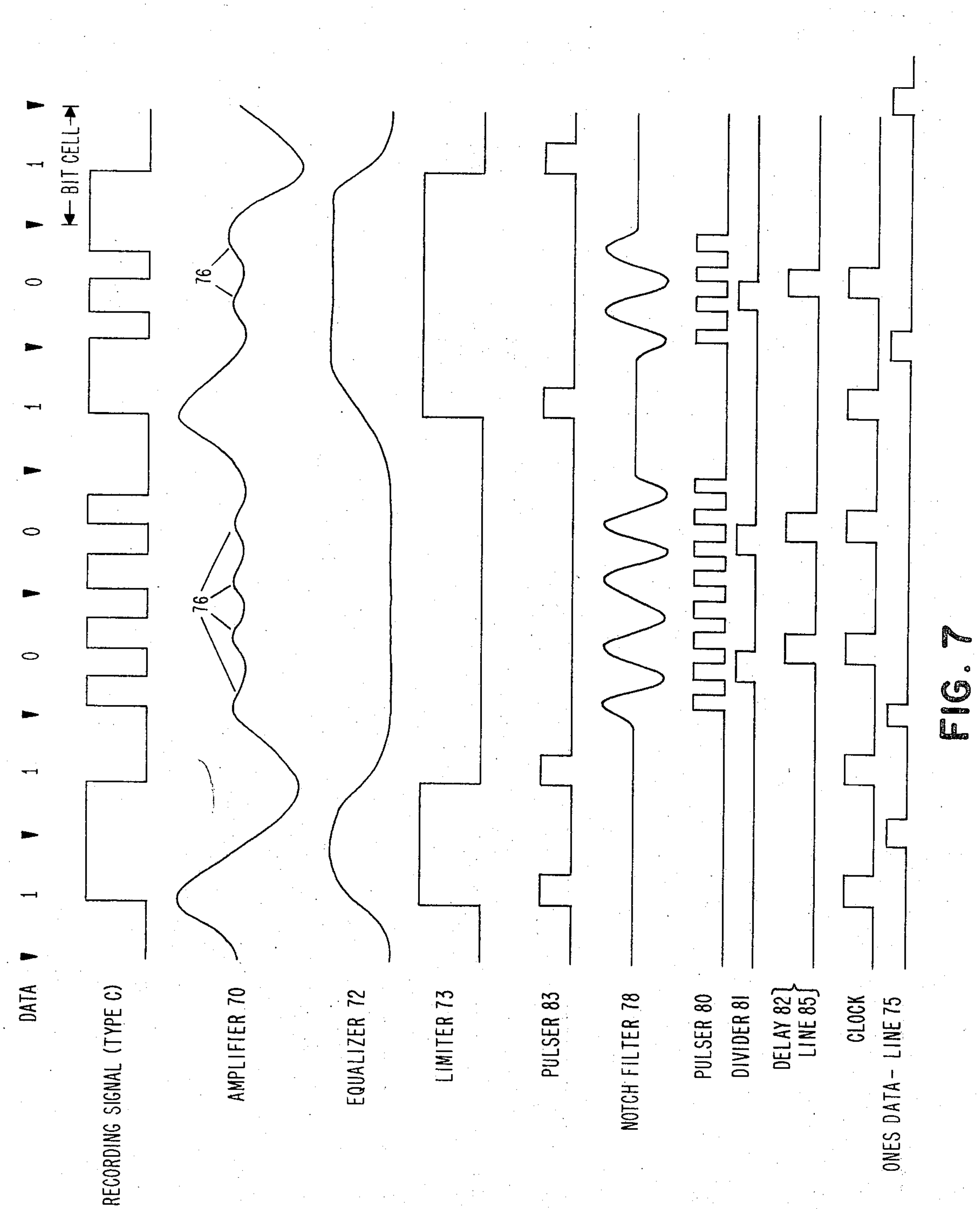
FIG. 7 is an idealized timing diagram illustrating the operation of the FIG. 6 illustrated apparatus.

Tape 54, having been recorded as explained with respect to FIGS. 4 and 5, has its signal sensed and reproduced as data in accordance with the FIG. 6 or FIG. 6A illustrated apparatus as can be seen by the timing diagram in FIG. 7. Head 53 supplies readback signals to amplifier 70, as well as to other channels 71. One of the plurality of channels is illustrated in detailed form, it being understood that the other channels are identically constructed. From amplifier 70, the readback signal is supplied through equalizer or inverse channel filter 72, then to limiter 73. Limiter 73 output signal synchronizes VFC (variable frequency clock) or oscillator 74 to synchronously detect the readback signals in detector 79. Detector 79 supplies detected signals over line 75. In the FIG. 7 illustrated signals, the "0" readback signal peaks 76 are shown with greater-than-observed amplitudes for clearly showing those signals.

In FIG. 6A, VFC 74 responds to both the 1's and 0's readback signals. Amplifier 70 output signals the "0" readback signals to pass. Pulse former 80 generates pulses from the "0" passed signals. Divide-by-four circuit 81 supplies pulses through delay 82 to OR 84 to generate a bit cell clock signal on line 85. In a similar manner, the limiter 78 output signals drive pulse former 83 to supply the "1" signal derived clocks to OR 84 to supply a clock signal whenever a binary 1 is being detected.

The divide-by-four circuit 81 supplies an output timing pulse for the second "0" signal in a row. Selecting the second "0" signal avoids any phase shift which may have occurred to the first-occurring "0" signal. Note the "1" transitions of interest for data recovery are not phase shifted.

While the invention has been particularly shown and described with reference to a preferred embodiment thereof, it will be understood by those skilled in the art that various changes in form and detail may be made therein without departing from the spirit and scope of the invention.

What is claimed is:

1. The method of recording two data values in a two-level magnetic record having successive bit cells, one cell for recording one data bit of either value, the improvement including the steps in combination:

representing a first data value in a bit cell as an odd number of transitions between said magnetic levels within a bit cell and none at a bit cell boundary such that the magnetic levels following two successive bit cell boundaries differ;

representing a second data value in a bit cell as an even number of transitions greater than two between said magnetic levels such that the magnetic levels following two successive bit cell boundaries are the same; and timing said transitions such that the total time duration of each level in each and every bit cell is substantially equal.

2. The method set forth in claim 1 including precisely centering one odd-numbered transition in a cell center and timing said even-numbered transition as $1/K$ bit cell spacings where $k$ is a small even-numbered integer greater than two.

3. The method set forth in claim 2 including timing said even-numbered transitions such that such transitions adjacent a bit cell boundary are displaced therefrom by $1/2k$ bit cell spacings.

4. The method set forth in claim 2 including timing said even transitions to include but one transition at a bit cell boundary and all others separated by $1/k$ bit cell spacing.

5. The method of phase tolerant high-density recording for magnetic media having two levels of residual magnetization and dividing the media into bit cells, each cell having two laterally extending boundaries, the improvement including the following steps in combination:

representing a first data value as a change between said two discrete levels between said boundaries and at the center of a bit cell;

representing a second data value as no change between said two discrete levels at the same side between two successive boundaries of a bit cell; and pulsing the magnetization levels between said cell boundaries at least in bit cells for representing said second data value such that the total durations of said discrete levels in each and every bit cell are equal yielding no net D.C. component in each and every bit cell.

6. The method set forth in claim 5 including only pulsing magnetization levels in said bit cells representing said second data value wherein each pulsation duration is $1/k$ of a bit cell, $k$ being a small integer greater than two.

7. The method set forth in claim 6 including timing one of said pulsations to include a transition at a bit cell boundary.

8. The method set forth in claim 6 including pulsing the magnetization beginning and ending at $1/2k$ spacing from bit cell boundaries.

9. A digital signal recording circuit having a transducer for recording signals and a data signal source for transferring data signals, a source of timing signals having a period of $1/k$ of a bit period where $k$ is a positive even integer, the improvement including in combination:

a bit cell divider circuit having $k$ stable states;

means responsive to a first data signal representing a first data value and to $k/2$ of said stable states having occurred in a bit cell period to supply a change in state signal;

means responsive to a second data signal representing a second data value and to said bit cell divider circuit to supply $k$ change in state signals; and means responsive to said change in state signals to supply recording signals to the transducer.

10. The method of enhancing operation of a digital signal two-record state magnetic recorder using a given NRZ-type recording signal, including the following steps:

interpreting said NRZ-type recording signal as an NRZI coded interpretation and timing such NRZI coded interpretation as having N times NRZI bit periods as said NRZ-type recording signal, N being a small integer, all transitions in said NRZ signal being NRZI 1's in an NRZI bit period and all intervening NRZI bit periods having NRZI 0's;

recording said NRZI 1's as a single record state transition at the center of an NRZI bit period; and recording said NRZI 0's as an even number of record state transitions, said even number being a small number greater than two and timing said transitions so that the record state durations of both said record states in each bit period are equal.

* * * * *